United States Patent
Wray

[15] 3,685,061
[45] Aug. 22, 1972

[54] CAR TOP CAMPER-BOAT

[72] Inventor: James D. Wray, 3040 Harrison St., Glenview, Ill. 60025

[22] Filed: June 29, 1970

[21] Appl. No.: 50,549

[52] U.S. Cl. ...................... 5/119, 135/1 A, 135/4 A, 224/42.01, 224/42.1 E
[51] Int. Cl. .............................................. B60r 9/04
[58] Field of Search ............ 224/42.1 E, 42.01, 421 R; 5/119; 135/1 A, 3 A, 4 A, 5 A

[56] References Cited

UNITED STATES PATENTS

| | | |
|---|---|---|
| 3,481,518 | 12/1969 | Anetsberger ........... 224/42.1 E |
| 3,255,466 | 6/1966 | Weizer .......................... 5/119 |
| 2,291,900 | 8/1942 | Jimmes ................. 224/42.1 E |
| 3,311,404 | 3/1967 | Thomas ............. 224/42.1 E X |

FOREIGN PATENTS OR APPLICATIONS 618,404 4/1961 Canada ................ 224/42.1 E

*Primary Examiner*—Gerald M. Forlenza
*Assistant Examiner*—George F. Abraham
*Attorney*—Johnson, Dienner, Emrich, Verbeck & Wagner

[57] ABSTRACT

A camper-boat combination adapted to be carried on the top of an automobile and including a base portion having attaching brackets for securing the unit to the rain gutters of the automobile, an upper rigid shell portion releasably hingedly connected at one end to the base portion and adapted to be raised to define a sleeping compartment, and side panels for enclosing the sleeping compartment, the upper rigid shell being removable for use as a pleasure boat.

14 Claims, 13 Drawing Figures

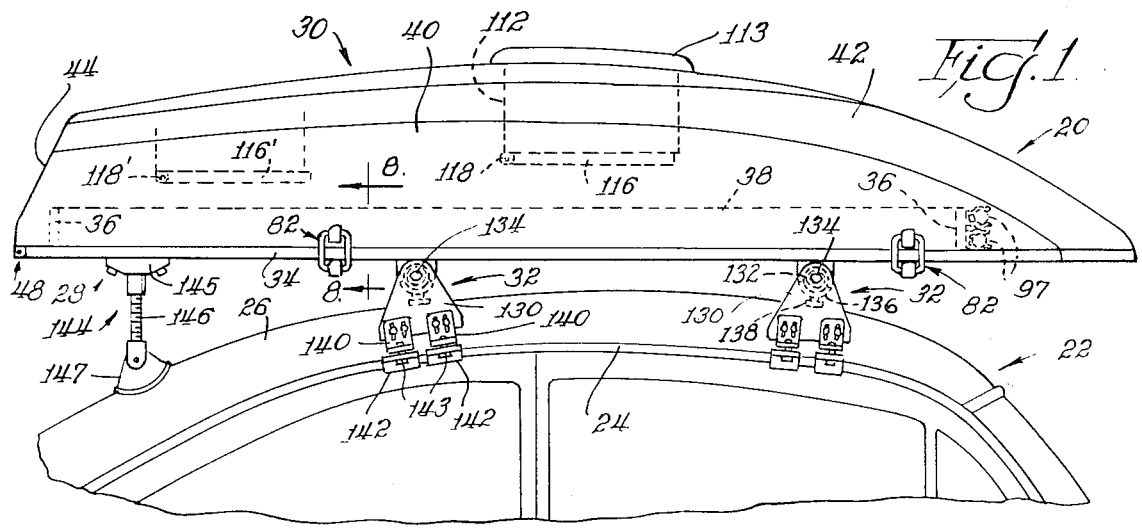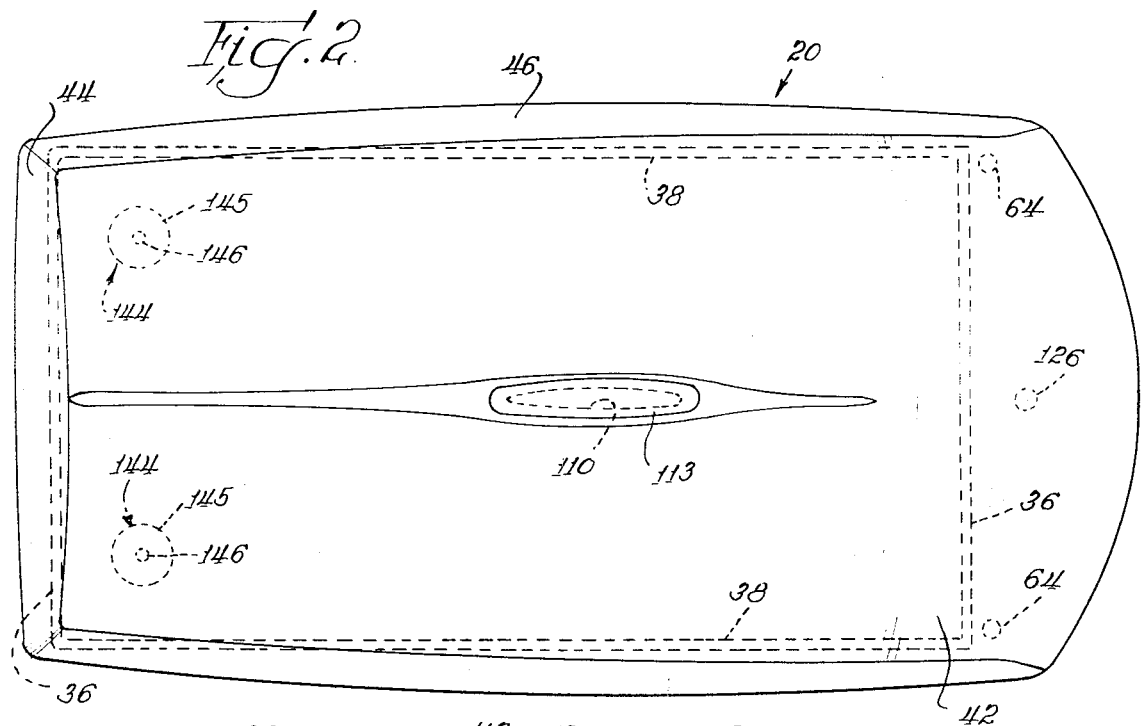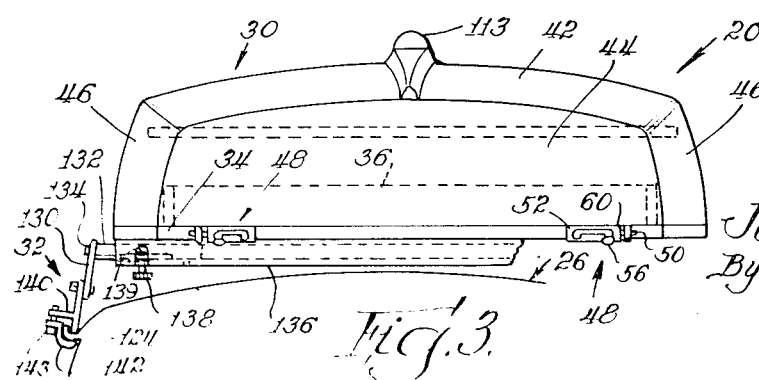

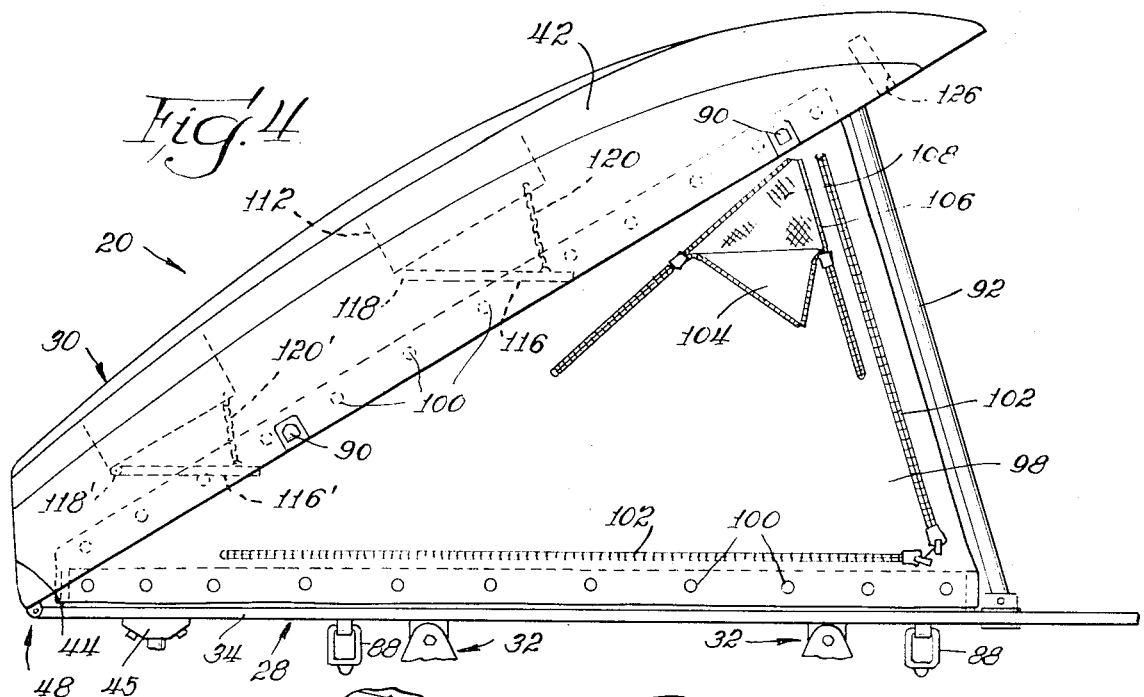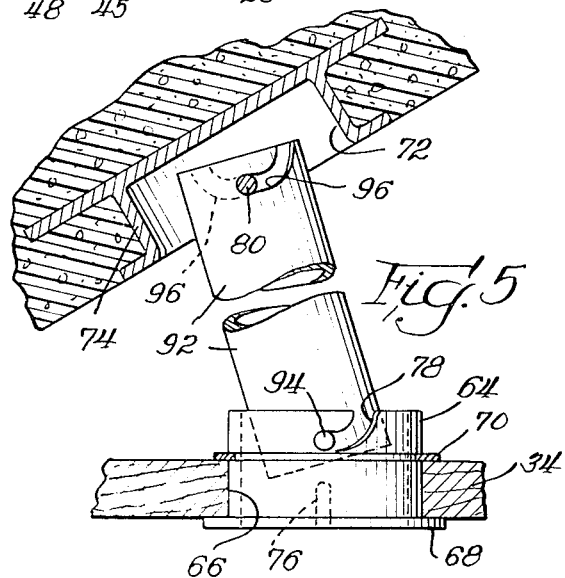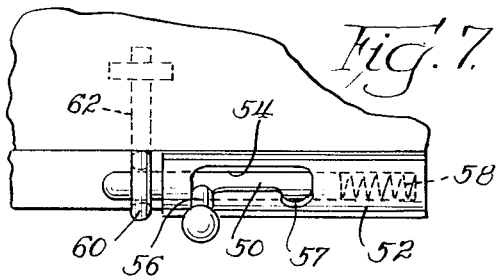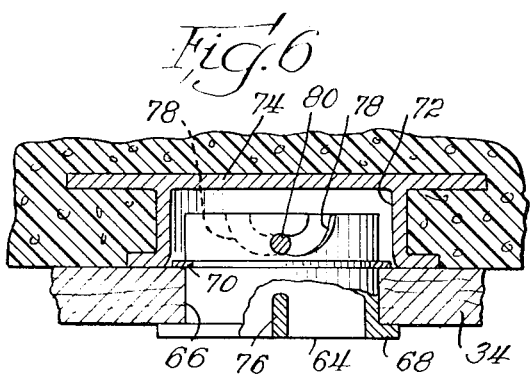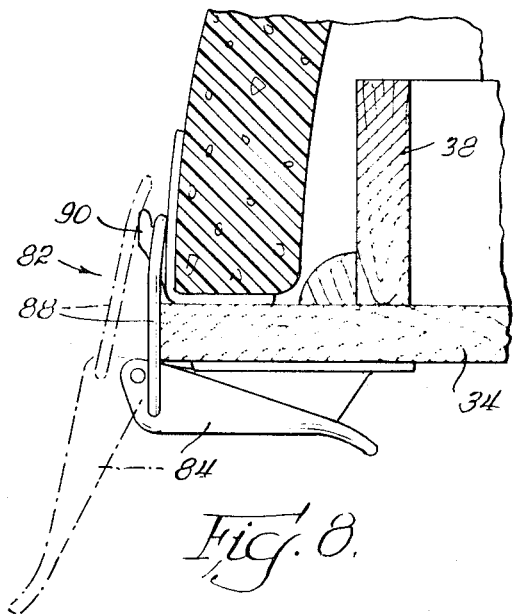

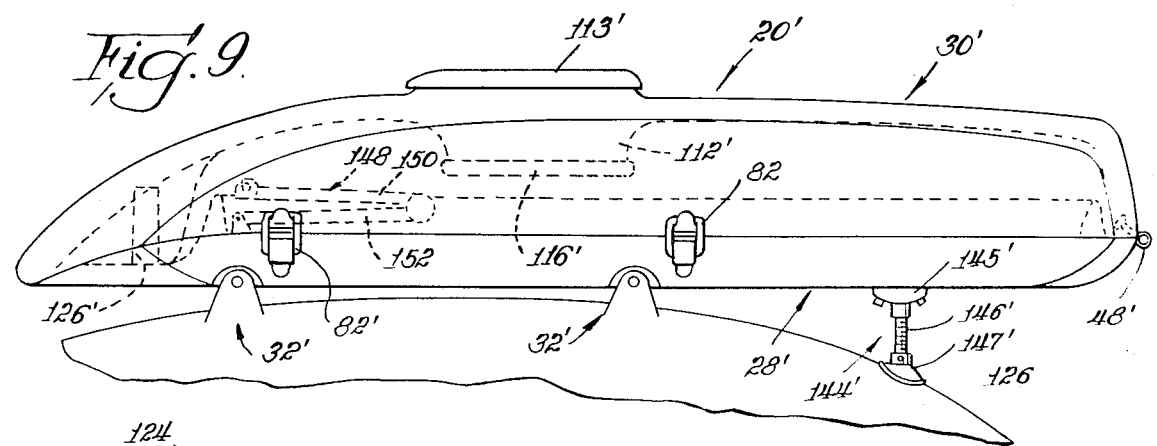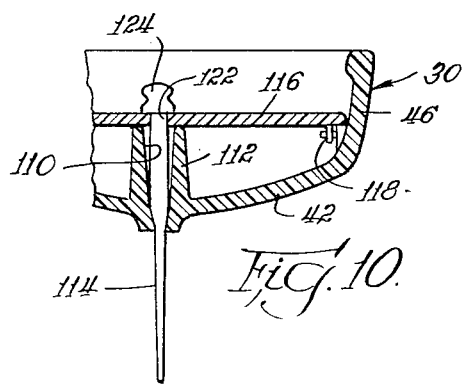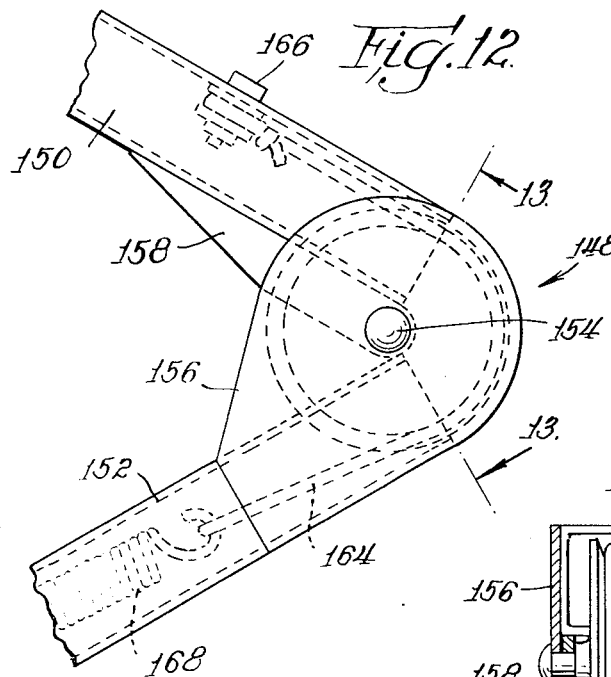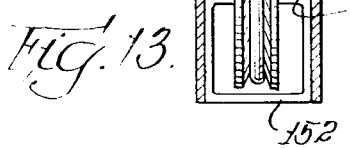

3,685,061

CAR TOP CAMPER-BOAT

Background of the Invention

The present invention relates generally to car top camper units, and particularly to a car top camper having an upper rigid shell portion which can be detached and inverted for use as a pleasure boat.

With the advent of more leisure time for travel and recreational activities, camper units such as can be carried on top of automobiles have become extremely popular. The majority of known car top camper units must be removed from the top of the automobile prior to being set up in the form of a tent or other enclosure for sleeping purposes. In most instances, the camper unit has a base portion upon which a tent-like arrangement is assembled to provide sleeping quarters and the like. The present invention is a substantial improvement over the known car top camper units and provides a camping and sleeping compartment which remains on top of the car, and has an upper portion which may be detached for use as a pleasure boat.

SUMMARY OF THE INVENTION

One of the primary objects of the present invention is to provide a car top camper-boat combination having a novel upper rigid shell portion which may be raised to provide a sleeping compartment and which may be detached and inverted to provide a pleasure boat.

Another object of the present invention is to provide a car top camper-boat arrangement including a base portion having novel means for attaching the base portion to the rain gutters of substantially any model automobile without the need for additional parts, the attaching means being adjustable to level the base portion as desired.

Another object of the present invention is to provide a car top camper-boat arrangement wherein the upper portion of the camper comprises a rigid shell hingedly secured to the base portion and movable between a lower traveling position and an upper position defining a sleeping compartment, and having side wall panels for enclosing the sleeping compartment and permitting access thereto.

Another object of the present invention is to provide a car top camper-boat arrangement as defined including hold-down means for securing the upper rigid shell portion to the lower base portion when in a traveling position, and including support arms cooperable with the hold-down means to maintain the upper shell portion in a raised position during its use as a camping unit.

In carrying out the above objects and advantages of my invention, I provide a camper-boat arrangement having a lower base portion adapted to be supported on top of an automobile, the base portion having attaching means providing generally universal adjustment for adaptation to the rain gutters of substantially any automobile. The lower base portion has a mattress retaining frame and hingedly supports an upper rigid shell movable between a first position fully engaging the base portion and a raised position defining a sleeping compartment. The upper rigid shell may be detached from the lower portion and inverted for use as a pleasure boat, the shell having a center board opening therethrough for this purpose. A transverse seat is hingedly secured within the rigid shell and is adapted to provide lateral support for the upper end of a center board, while being movable to a horizontal position when the shell is used to define the sleeping compartment to provide a utility shelf. Side panels are detachably secured to the lower base and upper shell portions and have window and door flaps for entrance to the sleeping compartment. Support arms are detachably carried by the base portion and cooperable with hold-down means to maintain the upper shell portion in a raised position during use as a sleeping unit.

Further objects and advantages of my invention, together with the organization with the organization and manner of operation thereof may best be understood by reference to the following description of a preferred embodiment of the invention when taken in conjunction with the accompanying drawings in which like reference numerals designate like parts throughout the several views.

BRIEF DESCRIPTION OF THE DRAWINGS

FIG. 1 is a side profile view of a car top camper-boat arrangement constructed in accordance with one embodiment of my invention, the camper-boat being illustrated as mounted on top of an automobile;

FIG. 2 is a top plan view of the camper-boat of FIG. 1;

FIG. 3 is a partial rear elevation view of the camper-boat arrangement of FIG. 1;

FIG. 4 is a side view of the camper-boat arrangement of FIG. 1 showing the upper rigid shell portion in a raised position to define a sleeping compartment;

FIG. 5 is an enlarged partial sectional view through one pair of cooperating hold-down elements shown in cooperation with a foreshortened support arm;

FIG. 6 is an enlarged partial sectional view showing the hold-down elements of FIG. 5 in their cooperating positions with the support arm removed;

FIG. 7 is an enlarged elevational view of the releasable hinge arrangement for securing the upper shell portion of the camper unit to the lower base portion;

FIG. 8 is an enlarged partial sectional view of a hold-down clamp taken substantially along the line 8—8 of FIG. 1, looking in the direction of the arrows;

FIG. 9 is a side profile view of an alternative camper-boat arrangement;

FIG. 10 is a partial transverse sectional view showing the upper rigid shell portion of the camper-boat in an inverted position for use as a pleasure boat with a center board inserted through the center board opening;

FIG. 11 is an enlarged foreshortened partial side view of one of the support arms used in conjunction with the camper unit illustrated in FIG. 9;

FIG. 12 is an enlarged partial view of the support arm of FIG. 11 with the arm sections being shown in partially collapsed positions; and FIG. 13 is a sectional view taken substantially along the line 13—13 of FIG. 12, looking in the direction of the arrows.

DESCRIPTION OF PREFERRED EMBODIMENTS

Referring now to the drawings, and in particular to FIGS. 1 – 3, a car top camper-boat arrangement in accordance with one embodiment of my invention is indicated generally at reference numeral 20. The car top camper-boat 20 is shown supported on top of an automobile partially shown at 22, the automobile having conventional rain gutters 24 extending along the lateral edges of a roof portion 26 as is known.

A camper-boat arrangement 20 includes a lower portion, indicated generally at 28, and an upper portion, indicated generally at 30. The lower portion 28 of the camper-boat arrangement is adapted to be secured to the rain gutters 24 of the automobile 22 through mounting means comprising forward and rear pairs of laterally spaced mounting bracket means, each of which is indicated generally at 32 and will be described more fully hereinbelow. Briefly, the mounting bracket means 32 provide generally universal adjustment to accommodate substantially any angular relation of automobile rain gutters 24 relative to the longitudinal axis of the automobile so as to adapt the camper-boat arrangement 20 for use with substantially all model automobiles. The mounting bracket means 32 also provide a means for leveling the camper-boat 20 on top of the automobile as desired.

The lower portion 28 of the camper-boat arrangement 20 comprises a generally planar base board 34 made of heavy strength plywood, fiberboard or the like. As will become more apparent hereinbelow, the base board 34 has a plan configuration substantially identical to the peripheral configuration of the adjacent engaging lower edge portion of the upper portion 30 of the camper-boat arrangement 20, which can best be seen by reference to FIG. 2. The baseboard 34 has a generally rectangular upstanding frame secured to the upper surface thereof comprising forward and rear transverse frame members 36 and longitudinally extending laterally spaced frame members 38 suitably secured to the transverse frame members 36. The rectangular frame defined by the frame members 36 and 38 serves to receive and retain a soft foam composition mattress (not shown) for sleeping when using the camper-boat 20 as a sleeping compartment.

The upper portion 30 of the camper-boat arrangement 20 comprises a rigid shell defining an inverted boat hull. The rigid upper shell portion 30 will be described in its assembled relation on the lower portion 28 of the camper-boat 20, it being understood that the relative designations of upper and lower surfaces on the rigid shell would be reversed when the shell is detached from the base board 34 and used as a pleasure boat. For example, the rigid shell 30 includes an upper surface portion 42 inclined downwardly adjacent its forward engagement with the forward edge of the base board 34, considered relative to the front end of the automobile 22, the upper surface 42 forming the lower surface for the rigid shell 30 when removed and inverted for use as a pleasure boat. The upper surface 42 terminates at its rear or stern end in a rear transverse transom member 44, and has its lateral side edges terminating in longitudinally extending upwardly inclined side portions 46. The end transom portion 44 and side portions 46 are formed integral with the top portion 42, the rigid shell so defined being preferably made of a fiberglass foam sandwich construction or other suitable plastic, light weight metal, or wood material. The lower edge surfaces of the forward end of the upper surface 42, the transom member 44 and the side portions 46 of the rigid shell 30 are coplanar and adapted to fully engage the upper surface of the base board 34 whereby to form an enclosed chamber between the base board and the cavity defined by the rigid shell.

The upper shell portion 30 of the camper-boat 20 is hingedly secured to the lower base board 34 adjacent the rear edge portion of the base board, considered in FIG. 1, through releasable hinge means comprising a pair of laterally spaced hinge members indicated generally at 48. Noting FIG. 3, taken in conjunction with FIG. 7, the hinge members 48 include a cylindrical bolt 50 longitudinally slidable within a housing 52 which is secured to the rearward edge surface of the lower base board 34. The housing 52 has an elongated slot 54 therein to receive an outwardly projecting operating arm 56 secured in normal relation to the bolt 50. The elongated slot 54 has offset recess portions 57 on both ends thereof to receive and retain the operating arm 56 in selected positions within the slot 54 as is known. Preferably, the bolt 50 is urged longitudinally outwardly from the housing 54 by a compression spring 58. The outer end of the bolt 58 is adapted to be releasably received within an eyelet 60 having a shaft portion 62 embedded within or otherwise suitably secured within the lower adjacent surface of the transom member 44. With the bolts 50 in their longitudinally extended positions to be received within the eyelets 60, it can be seen that the upper shell portion 30 of the camper-boat 20 can be pivoted upwardly about the axes of the bolts 50 from a first closed position as shown in FIG. 1 to a second raised position as shown in FIG. 4.

The camper-boat 20 includes means for releasably retaining the upper shell portion 30 against the base board 34 when the rearward end of the shell is connected to the base board through the hinge means 48. Noting FIG. 2, taken in conjunction with FIG. 6, such retaining or hold-down means includes a pair of laterally spaced tubular retaining members 64 received through circular openings 66 formed in the base board 34 generally adjacent the forward corners thereof, as shown in FIG. 2. The retaining members 64 have annular flanges 68 which engage the lower surface of the base board 34, the retaining members being secured within their respective openings 66 by snap rings 70 cooperating with annular grooves in the retaining members. The retaining members 64 extend upwardly from the upper surface of the base board 34 and are received within circular cavities 72 defined by inserts 74 embedded within the upper shell 30 in overlying relation to the openings 66 in the base board 34. Each of the retaining members 64 has a cross member 76 extending through the diameter thereof which provides a means for manually rotating the associated retaining member. The upper ends of the retaining members 64 have pairs of identical slots 78 formed diametrically opposite each other, each pair of slots being adapted to receive a cross pin 80 extending through a diameter of the corresponding insert 74 such that the retaining members can be rotated to releasably retain the pins 80 within the slots 78.

Additional means may be provided to retain the rigid shell 30 in its closed position against the base board 34, which additional means comprise hold-down clamps indicated generally at 82. Noting FIG. 1, taken in conjunction with FIG. 8, the hold-down clamps 82 are spaced longitudinally forwardly from the rear hinge means 48 of the camper-boat 20 and include levers 84 pivotally secured to the base board 34 at 86, the levers 84 having generally rectangular looped retaining members 88 pivotally secured thereon. The looped retaining members 86 are adapted to be received over hook elements 90 affixed to the upper shell 30 generally adjacent the lower edge surfaces of the depending sides 46. Movement of a lever arm 84 from a position as shown in phantom in FIG. 8 to a position as shown in solid lines, with the loop member 88 received over the corresponding hook element 90, effects an overcenter locking movement of the looped retaining member 88 relative to the pivot axes 86.

Release of the hold-down clamps 82 and release of the cross pins 80 from the slots 78 of the retaining members 64 allows the upper rigid shell 30 of the camper-boat to be raised to a position as shown in FIG. 4 defining a camping or sleeping compartment between the base board 34 and upper shell. Means including a pair of support arms 92 are provided to maintain the shell 30 in its upper raised position. Noting FIG. 5, each of the support arms 92 has a cross pin 94 secured radially through one end portion, the cross pins 94 being adapted to be received within the slots 78 of the retaining members 64. The support arms 92 have pairs of diametrically opposed identically shaped slots 96 formed in the ends thereof opposite the cross pins 94, each pair of slots 94 being adapted to receive one of the cross pins 80 within the inserts 74 in the upper shell 30. In this fashion, it can be seen that the support arms 94 may be releasably secured to the associated lower retaining members 64 and corresponding upper inserts 74 to maintain the rigid shell 30 in a selected raised position. When not used to support the upper shell 30, the support arms 92 may be releasably carried on the forward transverse frame member 36 by laterally spaced C-shaped brackets 97 (FIG. 1).

With reference to FIG. 4, side panels, one of which is indicated at 98, are provided to establish an enclosure cover for the sleeping or camping compartment created when the upper rigid shell 30 is in its raised position. The side panels 98 are made from a suitable flexible material such as aluminized MYLAR, or a waterproof rubberized or vinyl coated fabric. The side panels 98 are generally triangular in side profile configuration and are interconnected at their forward edge portions by a front transverse panel forming a front wall panel for the enclosure. The lower horizontal and upwardly inclined edge portions of the side panels 98 are releasably secured, respectively, to the outer upstanding surfaces of the associated mattress frame members 38 on the base plate 34, and to the inner lower edge surfaces of the associated depending sides 46 of the shell 30 by suitable means such as spaced snaps 100.

The side panel 98 on the side of the camper-boat 20 adjacent the passenger side of the automobile 22 is provided with an entrance and exit flap zippered at 102 within the associated side panel 98. A window flap 104 is also formed within one or both of the side flaps 98 and is zippered at 106 along two intersecting sides of the triangular window flap to allow opening and closing thereof. A relatively fine mesh screen 108 is sewn within the side panel 98 inwardly of the window flap 104 to prevent entrance of bugs and the like into the sleeping compartment.

As noted above, the upper rigid shell 30 is preferably formed of a molded fiberglass foam sandwich construction. Noting FIG. 10, a centerboard well 110 is formed in the rigid shell 30 defined by a closed loop wall portion 112 (FIG. 10) formed in generally upstanding relation from the bottom 42 of the rigid shell 30, when considered in its inverted position for use as a pleasure boat. The centerboard well 110 is covered with a removable weathertight cap 113 when not used as a pleasure boat so as to provide a weathertight inner compartment when the shell 30 is mounted on the base board 34. The centerboard well 110 is adapted to receive a centerboard 114 therein, the looped wall portion 112 being spaced outwardly from the side surfaces of the centerboard adjacent the upper end of the wall 112 such that no lateral forces will be imparted to the upper end of wall 112 by the centerboard 114 during sailing. To maintain the upper end of the centerboard 114 in laterally secured position, a transversely disposed seat member 116 is provided. Noting FIG. 4, taken in conjunction with FIG. 10, the seat member 116 is hingedly connected to the opposed side portions 46 of the rigid shell 30 through hinge connections 118 such that the seat 112 may be disposed horizontally when using the shell as a pleasure boat, but may be pivoted to a downward position when the rigid shell 30 is in its upper inclined association with the base board 34 whereupon the seat 116 may be used as an accessory shelf. Suitable chain means 120 or the like is secured to the seat 116 opposite the hinge connection 118 to limit downward pivotal movement of the seat when used as a shelf during camping. The seat 116 has an elongated slot 122 therethrough of a minor dimension sufficient to receive the upper end of the centerboard 112 therethrough while providing lateral support for the centerboard adjacent an upper enlarged portion 124 thereof. If desired, a second seat 116' may be similarly hingedly secured within the rigid shell 30 rearwardly from the transverse seat 116 and pivotable downwardly for use as a second shelf during camping.

A forward centrally disposed mast receiving well 126 is formed within the forward bow portion of the rigid shell 30 to receive the lower end of a sailing mast during use of the upper rigid shell 30 as a sail boat when removed from the baseboard 34 and inverted.

The mounting bracket means 32 for mounting the base plate 34 of the camper-boat 20 on top of an automobile include mounting plates 130 (FIGS. 1 and 3) each of which is secured to an outer end of a tubular shaft 132 through a bolt 134. The shafts 132 are slidably received in pairs within opposite ends of parallel tubular cross shafts 136 which are fixedly secured to the lower surface of the baseboard 34 in transverse relation thereto and spaced longitudinally as shown in FIG. 1. An adjustment hand screw 138 is operatively associated with each tubular shaft 132 and associated cross shaft 136 for manually locking the shafts 132 in selected fixed positions with the cross shafts. Each adjustment screw 138 has its shank portion received through an elongated slot 139 formed in the tubular shaft 136, the slots 139 lying in planes normal to the axis of shaft 136 and having arcuate lengths less than 180°. The shank of each screw 138 is similarly slidingly received through an elongated slot formed longitudinally in the corresponding tubular shaft 132. A nut is secured on the innermost end of each screw 138 for tightening onto the screws whereby to fix the shafts 132 longitudinally and rotatably within the associated shafts 136.

The outer closed end surface of each shaft 132 is disposed in a plane which is angularly inclined relative to the axis of the shaft 132 such that the mounting plates 130 may be rotatably adjusted on the ends of the shafts 132, with the shafts being also adjustable within the cross shafts 136 to allow substantially universal adjustment of the mounting plates 130.

Noting FIG. 1, a pair of rain gutter attaching brackets 140 are connected to each of the mounting plates 130 through adjustment screws received through elongated slots in the attaching brackets 140. Each of the attaching brackets 140 has an adjustable locking member 142 connected to a flange portion thereof through screws 143 such that the locking member 142 is adapted to engage a lower surface portion of a rain gutter 24 and cooperate with the lower edge of the associated attaching bracket 140 which is received within the rain gutter to fixedly retain the mounting plates 130 on the rain gutters 24. In this manner, the mounting bracket means 32 may be adapted for attachment to the rain gutters of substantially any model automobile independent of the angular relation of the rain gutter to the longitudinal axis of the automobile. The elongated slots in the attaching brackets 140 allow the attachment brackets to be adjusted vertically on the mounting plates 130, thus providing means for leveling the base board 34 and associated upper shell 30 relative to the road.

The car top camper-boat 20 includes one or more rear adjustable support braces, indicated generally at 144, to support the over-hang portion of the baseboard 34 disposed rearwardly of the rear mounting bracket means 32. Preferably, at least two laterally spaced support braces 144 are provided and find particular need when the car top camper-boat 20 is mounted on an automobile having a relatively short length of usable rain gutter 24 on which to suitably space the mounting brackets 32. It has been found that the support braces 144 are needed when the pairs of mounting brackets 32 cannot be spaced about approximately 4 feet apart. Each of the support braces 144 includes an upper flange 145 secured to the lower surface of the baseboard 34 inwardly from the side edge thereof, an adjustable leg portion 146 threadedly engaging or otherwise adjustably secured to the upper flange 145, and a lower car roof engaging flange or pad 147. The lower pad 147 is pivotally secured to the leg 146 through a pivot pin or ball-socket arrangement so as to accommodate any angular inclination of the car roof relative to the baseboard 34. The support braces 144 provide additional means in conjunction with the mounting bracket means 32 to adjust the level of the camper-boat 20 relative to the road.

FIG. 9 illustrates an alternative embodiment of my car top camper-boat indicated generally at reference numeral 20'. The car top camper-boat 20' is generally similar to the above described car top camper-boat 20 but utilizes a lower base portion 28' and an upper rigid shell portion 30' both of which are made of fiberglass foam sandwich construction. The upper rigid shell 30' is hingedly connected to the lower base portion 28' adjacent the rear edge portion thereof, as at 48', and has a centerboard well formed therein at 110'. The base portion 28' is adapted to be mounted on top of an automobile through mounting means 32' in similar fashion to the above described mounting means 32.

The lower portion 28' of the camper-boat arrangement 20' employs hold-down clamps 82' to retain the upper portion 30' in locked position on the lower portion 28' during travel, the upper shell 30' being removable from the lower portion 28' and invertable for use as a pleasure boat. The lower portion 28' of the camper-boat arrangement 20' differs from the base board 34 of the lower portion 28 of the aforedescribed camper-boat arrangement 20 in that it is made of a fiberglass sandwich construction and is of a greater vertical thickness than the baseboard 34'. The rearward end of the lower portion 28' is curved upwardly adjacent the hinge connection 48' to the upper shell 30', the forward edge portion of the shell 30' being rounded or curved to effect aerodynamic streamlining of the camper-boat 20'.

Noting FIG. 9, taken in conjunction with FIGS. 11–13, the camper-boat arrangement 20' employs support arm means, indicated generally at 148, for supporting the upper rigid shell 30' in a raised position for camping in similar fashion to the raised shell 30 illustrated in FIG. 4. The support arm means 148 comprise a pair of arm assemblies disposed in laterally spaced relation on opposite sides of the longitudinal axis of the camper-boat 20', each of the arm assemblies including an upper arm 150 and a lower arm 152. The upper and lower arms 150 and 152 are pivotally connected through a pivot pin 154 received through generally circular spaced plate portions 156 suitably secured to the lower arm 152, and spaced flange portions 158 secured to the upper arm 150. The upper and lower arm portions 150 and 152 of each support arm means 148 are pivotally secured to the upper rigid shell 30' and lower base portion 28' of the camper-boat arrangement 20' through similar attaching means comprising brackets 160 pivotally secured to the upper and lower arms as at 162, the brackets 160 in turn being suitably secured to the respective upper shell 30' and lower base portion 28'. In this fashion, the arms 150 and 152 may be pivoted about the pivot axis 154 to collapsed positions as shown in FIG. 9 so as to lie within the cavity between the lower base portion 28' and upper shell 30' of the camper-boat 20'. Each support arm assembly 148 includes means for urging the upper and lower arms 150 and 152 to their axially aligned positions whereby to assist in raising the upper shell 30' as when camping. Such urging means includes a strap or wire 164 having one end fixedly secured to the upper arm 150 through an attaching bolt 166, and having the other end connected to one end of a tension spring 168. The lower ends of the tension springs 168 are affixed to cross bolts 170 within the lower arm portions 152. In this manner, it can be seen that the tension springs 168 and associated straps 164 normally urge the pivotally connected arms 150 and 152 to axially aligned positions as shown in FIG. 11, the arms being collapsible to the aforesaid positions as shown in FIG. 9. The support arm means 148 provide alternative support means for the upper rigid shells 30 and 30' and may be preferred over the above described support arms 92.

It will be understood that non-rigid side panels 98 are provided in the camper-boat arrangement 20' which are detachably secured to the lower base portion 28' and upper shell 30' for establishing a substantially enclosed sleeping compartment when the upper shell is in its raised position. Rear adjustable support braces 144' may also be provided on the camper-boat 20' if needed.

Having thus described two embodiments of my camper-boat arrangement, it can be seen that I have provided a novel car-top camper providing both the advantages of a light weight, convenient and quickly assembled camping or sleeping compartment in combination with a portion of the camper which may be readily detached and used as a pleasure boat. It will be understood that changes and modifications may be made in the described embodiments without departing from the invention in its broader aspects.

What is claimed is:

1. A camper-boat arrangement for mounting and use on top of an automobile having rain gutters extending along the lateral edge portions of the roof, comprising, in combination, a lower base portion, means secured to said lower base portion for mounting the same horizontally on top of the automobile, an upper boat portion releasably hingedly secured to said base portion, said upper boat portion comprising a rigid shell defining a boat hull removable from said lower base portion and invertible to form a pleasure boat, said boat hull having an upper surface inclined downwardly toward its forward edge and having a rearward transom member transverse to the longitudinal axis of the boat hull, considered with the boat hull in its inverted position on the lower base portion, said upper boat portion being adjustable about its hinge connection between a first position defining an enclosed compartment with said base portion and a second position upwardly inclined relative to said base portion, flexible wall means connected to said lower base portion and said upper boat portion generally adjacent the lateral and forward edge portions thereof to form a sleeping compartment when said upper boat portion is in its raised position, and means for selectively maintaining said upper portion in its said second position, said lower base portion including at least one generally vertically disposed hold-down sleeve mounted for rotation about a generally vertical axis, said hold-down sleeve having means accessible from below said base portion for effecting rotation thereof, said upper portion including retainer means cooperable with said hold-down sleeve to retain said upper portion in its said first position, said hold-down sleeve and said retainer means being releasable to allow movement of said upper portion to its said second position.

2. A camper-boat arrangement as defined in claim 1 wherein said means for selectively maintaining said upper portion in its said second position comprises at least one support arm having opposite end portions cooperable with said hold-down sleeve and said retainer means disposed in said upper portion.

3. A camper-boat arrangement as defined in claim 2, wherein aid hold-down sleeve includes a pair of similarly shaped slots intersecting the upper end of said hold-down sleeve, and wherein said retainer means within said upper portion for cooperation with said hold-down sleeve includes a cross pin adapted to be releasably cooperatively retained within said slots in said hold-down sleeve, said hold-down sleeve being rotatable in a first direction to retain the said cross pin within said slots and rotatable in an opposite direction to release said cross pin from said slots.

4. A camper-boat arrangement as defined in claim 1 wherein said means secured to said lower base portion for mounting the same on top of the automobile comprise mounting bracket means adapted for attachment to the opposite laterally spaced rain gutters of the automobile, said mounting bracket means being angularly adjustable to accommodate substantially any angular relationship of the gutters to the longitudinal axis of the automobile.

5. A camper-boat arrangement as defined in claim 1 wherein said flexible wall means include side panels releasably securable to said lower and upper portions of the camper-boat, at least one of said side panels having a flap therein defining a door means for entrance and exit from the compartment defined when said upper portion is in said upwardly inclined second position.

6. A camper-boat arrangement as defined in claim 5 wherein at least one of said side panels has a screen window opening therein and a protective flap thereover.

7. A camper-boat arrangement as defined in claim 1 wherein said upper portion is hingedly connected to said base portion generally adjacent one end thereof, and wherein said means for selectively maintaining said upper portion in said second position includes a pair of laterally spaced support arm means, each of said support arm means including upper and lower pivotally connected arm portions, and including biasing means urging said arms to axially aligned positions.

8. A camper-boat arrangement as defined in claim 7 wherein said upper and lower arm portions are hingedly connected to said upper and lower portions of the camper-boat opposite the pivotal connection therebetween, said arm portions being collapsible to positions within the cavity defined between said rigid shell and said base portion when said second portion is in its said first position.

9. A camper-boat arrangement as defined in claim 4 wherein said mounting bracket means include vertically adjustable means to permit leveling of said base portion relative to the road.

10. A camper-boat arrangement as defined in claim 1 including support brace means secured to said lower base portion longitudinally rearwardly of said mounting means, said support brace means being adapted to engage the roof of the automobile and provide additional support with said mounting means.

11. A camper-boat arrangement as defined in claim 10 wherein said support brace means are adjustable to effect leveling of said lower base portion relative to the road.

12. A camper-boat arrangement for mounting and use on top of an automobile, comprising, combination, a lower base portion, means secured to said lower base portion for mounting the same on the top of the automobile, an upper boat portion releasably hingedly secured to said base portion, said upper boat portion comprising a rigid shell defining a boat hull removable from said lower base portion and invertible to form a pleasure boat, said upper portion being adjustable about its hinge connection between a first position defining an enclosed cavity with said base portion and a second position upwardly inclined relative to said base portion, said lower base portion including at least one vertically disposed hold-down sleeve mounted for rotation about a generally vertical axis, said upper boat portion including retainer means cooperable with said hold-down sleeve to retain said upper portion in its said first position and being releasable to allow movement of said upper portion to its said second position, means for selectively maintaining said upper portion in its said second position including at least one support arm having opposite end portions cooperable with said hold-down sleeve and said retainer means to establish a sleeping compartment between said lower and upper portions with said upper portion in its raised position, said upper boat portion having a centerboard opening extending therethrough along the longitudinal axis of said upper portion, said centerboard opening being partially defined by an upstanding wall, and including seat means secured to said upper portion within said rigid shell, said seat means being pivotally movable between a first position overlying said centerboard opening and a second position disposed horizontally when said upper shell portion is in its said upwardly inclined second position.

13. A camper-boat arrangement as defined in claim 12 wherein said seat has an elongated slot therethrough overlying said centerboard opening when said seat is in its said first position, said elongated opening in said seat serving to receive a centerboard therethrough and provide lateral support for said centerboard as it is installed within said centerboard opening in said rigid shell.

14. A camper-boat arrangement for mounting and use on top of an automobile having rain gutters extending along the lateral edge portions of the roof, comprising, in combination, a lower base portion, mounting bracket means secured to said lower base portion for mounting the same on the rain gutters of the automobile, an upper boat portion releasably hingedly secured to said base portion, said upper boat portion comprising a rigid shell defining a boat hull removable from said lower base portion and invertible to form a pleasure boat, said upper boat portion being adjustable about its hinge axis between a first position defining an enclosed compartment with said base portion and a second position upwardly inclined relative to said base portion to form a sleeping compartment, and means for selectively maintaining said upper portion in its said second position, said mounting bracket means including a pair of cylindrical tubular members secured to said lower portion in transverse relation to the longitudinal axis thereof, said tubular members being spaced longitudinally along said base portion and having shorter length cylindrical members slidably received in the opposite end portions thereof for rotation about their longitudinal axes, said shorter length members each having a mounting surface on the outer end thereof lying in a plane angularly disposed from a plane normal to the longitudinal axis of said shorter length member, and mounting plate means adjustably secured to each of said mounting surfaces, said mounting plate means including means for releasably attaching said mounting plate means to the rain gutters of the automobile, said shorter length members being rotatable within their associated tubular members to vary the angular relation of said mounting plate means relative to the axes of said tubular members to accommodate various angular relationships of the gutters to the longitudinal axis of the automobile.

* * * * *